(12) United States Patent
Zeng et al.

(10) Patent No.: US 9,983,306 B2
(45) Date of Patent: May 29, 2018

(54) SYSTEM AND METHOD FOR PROVIDING TARGET THREAT ASSESSMENT IN A COLLISION AVOIDANCE SYSTEM ON A VEHICLE

(71) Applicant: GM GLOBAL TECHNOLOGY OPERATIONS LLC, Detroit, MI (US)

(72) Inventors: Shuqing Zeng, Sterling Heights, MI (US); Wende Zhang, Troy, MI (US); Mark E. Shields, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 275 days.

(21) Appl. No.: 14/980,327

(22) Filed: Dec. 28, 2015

(65) Prior Publication Data

US 2016/0109571 A1   Apr. 21, 2016

Related U.S. Application Data

(63) Continuation of application No. 13/901,123, filed on May 23, 2013, now Pat. No. 9,250,324.

(51) Int. Cl.
*G01S 13/93* (2006.01)
*G01S 7/40* (2006.01)
(Continued)

(52) U.S. Cl.
CPC .............. *G01S 13/931* (2013.01); *G01S 7/40* (2013.01); *G01S 7/41* (2013.01); *G01S 13/87* (2013.01);
(Continued)

(58) Field of Classification Search
CPC . G01S 13/931; G01S 7/40; G01S 7/41; G01S 13/87; G01S 2013/9346;
(Continued)

(56) References Cited

U.S. PATENT DOCUMENTS 5,341,142 A   8/1994 Reis et al.
5,471,214 A   11/1995 Faibish et al.
(Continued)

FOREIGN PATENT DOCUMENTS

JP         4784709 B1   10/2011

*Primary Examiner* — Bernarr E Gregory
(74) *Attorney, Agent, or Firm* — John A. Miller; Shumaker, Loop & Kendrick, LLP

(57) ABSTRACT

A system and method for providing target selection and threat assessment for vehicle collision avoidance purposes that employ probability analysis of radar scan returns. The system determines a travel path of a host vehicle and provides a radar signal transmitted from a sensor on the host vehicle. The system receives multiple scan return points from detected objects, processes the scan return points to generate a distribution signal defining a contour of each detected object, and processes the scan return points to provide a position, a translation velocity and an angular velocity of each detected object. The system selects the objects that may enter the travel path of the host vehicle, and makes a threat assessment of those objects by comparing a number of scan return points that indicate that the object may enter the travel path to the number of the scan points that are received for that object.

20 Claims, 6 Drawing Sheets

(51) Int. Cl.
    *G01S 13/87*     (2006.01)
    *G01S 7/41*     (2006.01)
    *G01S 13/00*     (2006.01)

(52) U.S. Cl.
    CPC ............... *G01S 2007/4039* (2013.01); *G01S 2013/9346* (2013.01); *G01S 2013/9375* (2013.01)

(58) Field of Classification Search
    CPC .... G01S 2007/4039; G01S 2013/9375; B60W 40/072; B60R 21/0134; B64D 45/04
    See application file for complete search history.

(56) References Cited

U.S. PATENT DOCUMENTS

| | | | |
|---|---|---|---|
| 5,612,699 | A | 3/1997 | Yamada |
| 5,613,039 | A | 3/1997 | Wang et al. |
| 5,710,565 | A | 1/1998 | Shirai et al. |
| 5,793,325 | A | 8/1998 | Yamada |
| 5,929,803 | A | 7/1999 | Uehara et al. |
| 5,959,571 | A * | 9/1999 | Aoyagi et al. .. G01S 2013/9375 |
| 6,018,308 | A * | 1/2000 | Shirai .................. G01S 13/931 |
| 6,026,347 | A | 2/2000 | Schuster |
| 6,085,151 | A | 7/2000 | Farmer |
| 6,163,252 | A | 12/2000 | Nishiwaki |
| 6,225,891 | B1 | 5/2001 | Lyons et al. |
| 6,420,996 | B1 | 7/2002 | Stopczynski et al. |
| 6,438,491 | B1 | 8/2002 | Farmer |
| 6,484,087 | B2 | 11/2002 | Shirai et al. |
| 6,775,605 | B2 * | 8/2004 | Rao et al. ............ G01S 13/931 |
| 7,498,972 | B2 | 3/2009 | Tanaka |
| 7,639,841 | B2 | 12/2009 | Zhu et al. |
| 7,783,112 | B2 | 8/2010 | Ruch |
| 7,831,098 | B2 | 11/2010 | Melikian |
| 7,881,868 | B2 | 2/2011 | Greene et al. |
| 7,894,631 | B2 | 2/2011 | Kakinami |
| 7,920,087 | B2 | 4/2011 | Ogawa |
| 7,974,442 | B2 | 7/2011 | Camus et al. |
| 8,055,445 | B2 | 11/2011 | Schiffmann et al. |
| 8,077,965 | B2 | 12/2011 | Kakinami et al. |
| 8,098,889 | B2 | 1/2012 | Zhu et al. |
| 8,290,637 | B2 | 10/2012 | Krupadanam et al. |
| 8,299,957 | B2 | 10/2012 | Tseng |
| 8,686,893 | B2 | 4/2014 | Watanabe et al. |
| 9,250,324 | B2 * | 2/2016 | Zeng et al. ........... G01S 13/931 |
| 2006/0115113 | A1 | 6/2006 | Lages et al. |
| 2009/0292468 | A1 | 11/2009 | Wu et al. |
| 2010/0034422 | A1 | 2/2010 | James et al. |
| 2010/0061623 | A1 | 3/2010 | Yokoi et al. |
| 2010/0063735 | A1 * | 3/2010 | Kindo et al. ........ B60W 40/072 |
| 2010/0202657 | A1 | 8/2010 | Salgian et al. |
| 2010/0214155 | A1 * | 8/2010 | Harada ................ B60R 21/0134 |
| 2013/0046459 | A1 * | 2/2013 | Itakura .................. B64D 45/04 |

\* cited by examiner

SYSTEM AND METHOD FOR PROVIDING TARGET THREAT ASSESSMENT IN A COLLISION AVOIDANCE SYSTEM ON A VEHICLE

CROSS-REFERENCE TO RELATED APPLICATIONS

This application is a Continuation application of U.S. patent application Ser. No. 13/901,123, titled Probabilistic Target Selection and Threat Assessment Method and Application to Intersection Collision Alert System, filed May 23, 2013, now U.S. Pat. No. 9,250,324.

BACKGROUND OF THE INVENTION

Field of the Invention

This invention relates generally to a system and method for providing target selection and threat assessment in a vehicle collision avoidance (VCA) system and, more particularly, to a system and method for providing target selection and threat assessment in a VCA system that employs probability analysis of radar/LiDAR scan returns.

Discussion of the Related Art

Modern vehicles sometimes include a collision avoidance system that employs object detection sensors that are used to enable collision warning or avoidance and other active safety applications. The object detection sensors may use any of a number of technologies, such as short range radar, long range radar, cameras with image processing, laser or LiDAR, ultrasound, etc. The object detection sensors detect vehicles and other objects in the path of a host vehicle, and the application software uses the object detection information to provide warnings or take actions as appropriate. In many vehicles, the object detection sensors are integrated directly into the front bumper or other fascia of the vehicle.

In order for the collision avoidance system to perform optimally, the object detection sensors must be aligned properly with the vehicle. For example, if a sensor detects an object that is in the path of the host vehicle but, due to sensor misalignment, the sensor determines that the object is slightly to one side of the path of the host vehicle, this can have significant consequences for the application software. Even if there are multiple forward looking object detection sensors on a vehicle, it is important that they are all aligned properly, so as to minimize or eliminate conflicting sensor readings.

Traditional vehicle radar sensors only provide a single radar return from a detected object per sample time. The radar return is typically a point that indicates the location of the entire object. Therefore, the exact location of the object is identified at a different location depending on what part of the object the radar return originated from, sometimes resulting in a missed collision warning. Also, noise in the system could indicate that the radar return was from a location slightly off from where the object actually is, sometimes resulting in a false indication of a collision.

SUMMARY OF THE INVENTION

The present invention discloses and describes a system and method are disclosed for providing target selection and threat assessment for vehicle collision avoidance purposes that employ probability analysis of radar scan returns. The system determines a travel path of a host vehicle using motion dynamics of the host vehicle and provides a radar signal transmitted from at least one sensor on the host vehicle. The system receives multiple scan return points from one or more detected objects that reflect the radar signal, processes the scan return points to generate a distribution signal defining a contour of each detected object, and processes the scan return points to provide a position, a translation velocity and an angular velocity of each detected object. The system selects the objects that may be in or enter the travel path of the host vehicle using the distribution, position, translation velocity and angular velocity of each object, and makes a threat assessment of those objects that are in or may enter the travel path of the host vehicle by comparing a number of scan return points that indicate that the object is in or may enter the travel path to the number of the scan points that are received for that object.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing target selection and threat assessment in a vehicle collision avoidance system using probability analysis of multiple radar/LiDAR scan points is merely exemplary in nature, and is in no way intended to limit the invention or its applications or uses. For example, the probability technique discussed herein may have application for other systems other than vehicle collision avoidance systems.

Figure 1:
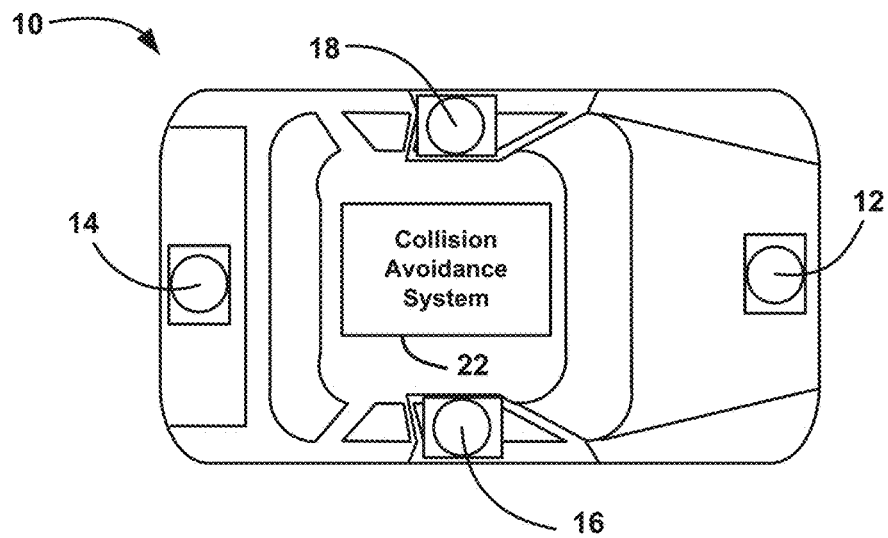
FIG. 1 is an illustration of a vehicle including multiple radar or LiDAR sensors.

FIG. 1 is an illustration of a vehicle 10 including a front-view sensor 12, a rear-view sensor 14, a right-side view sensor 16 and a left-side view sensor 18. The sensors 12-18 are intended to represent any sensor applicable for a vehicle collision avoidance system including radar sensors, LIDAR sensors, cameras, etc., and suitable for the purposes described herein, many of which are known in the automotive art. The sensors 12-18 can be mounted within or on any suitable structure that is part of the vehicle 10, such as bumpers, fascia, grill, side-view mirrors, door panels, etc., as would be well understood and appreciated by those skilled in the art. Sensor data from the sensors 12-18 is provided to a collision avoidance system 22 that processes the data to provide collision avoidance functions. The system 22 is intended to represent any and/or all of the devices, circuits, processors, software, etc. necessary to process sensor data and provide the signals and operations as discussed herein.

Figure 2:
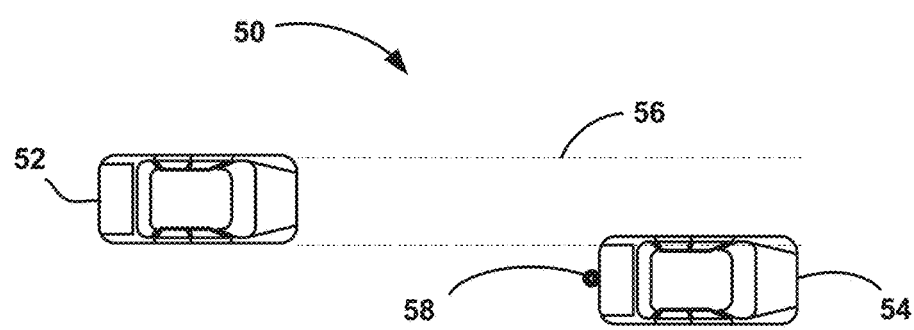
FIG. 2 is an illustration showing a host vehicle including a traditional radar sensor that does not detect a target vehicle within its travel path.

As mentioned above, if the sensors 12-18 are traditional radar sensors they would provide a single radar return. FIG. 2 is an illustration 50 showing a host vehicle 52 including a collision avoidance system (not shown) trailing a target vehicle 54, where a path 56 in front of the vehicle 52 is a collision path for the current direction of travel of the vehicle 52. The host vehicle 52 includes one or more traditional radar sensors (not shown) that provide a single radar scan return point 58 from the target vehicle 54. As shown, the scan return point 58 is a reflection from a part of the vehicle 54 that is not within the collision path 56. The illustration 50 is intended to show a missing alarm condition where some or all of the target vehicle 54 is within the collision path 56 of the host vehicle 52, but the scan point 58 indicates that the vehicle 54 is outside of the path 56, where the collision avoidance system on the vehicle 52 would not provide a warning of a potential collision.

Figure 3:
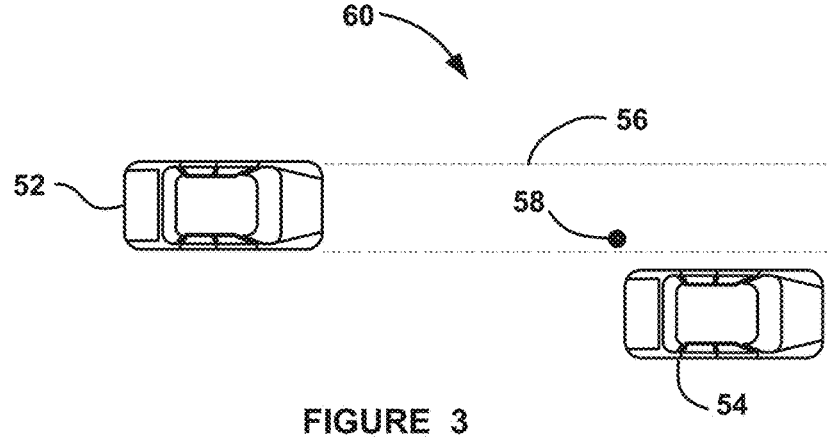
FIG. 3 is an illustration showing a host vehicle including a traditional radar sensor detecting a target vehicle within its travel path when it is not.

FIG. 3 is an illustration 60 similar to the illustration 50, where like elements are identified by the same reference number. In the illustration 60, the target vehicle 54 is completely outside of the collision path 56. However, the single scan return point 58, whose position is effected by noise in this case and is not on the vehicle 56, is within the collision path 56 providing a false collision alarm condition.

Many modern types of radar sensors that are sometimes employed on vehicles to detect objects around the vehicle and provide a range to and orientation of those objects provide reflections from the objects as multiple scan points that combine as a point cluster range map, where a separate scan point is provided for every ½° across the field-of-view of the sensor. Therefore, if a target vehicle or other object is detected in front of the host vehicle, there may be multiple scan points that are returned that identify the distance of the target vehicle from the host vehicle. By providing a cluster of scan return points, objects having various and arbitrary shapes, such as trucks, trailers, bicycle, pedestrian, guard rail, K-barrier, etc., can be more readily detected, where the bigger and/or closer the object to the host vehicle the more scan points are provided. Other types of sensors also provide a point cluster range map including multiple scan points including LiDAR sensors, stereo cameras, i.e., two or more cameras, etc.

A vehicle may have multiple sensors to provide a 360° field-of-view around the vehicle. These multiple sensors may include side looking sensors, rearward looking sensors and forward looking sensors. Each of the sensors track objects in its field-of-view independently of the other sensors. Using the scan return points from the multiple sensors, the scan map is generated to track objects in proximity to the host vehicle. For a vehicle with multiple sensors, multiple scan point cluster maps are returned, and for over-lapping sensor field-of-views, the sensors may be tracking the same object. It is necessary to combine the scan point maps of the sensors so that the same object tracked by the sensors is processed as a single target.

Figure 4:
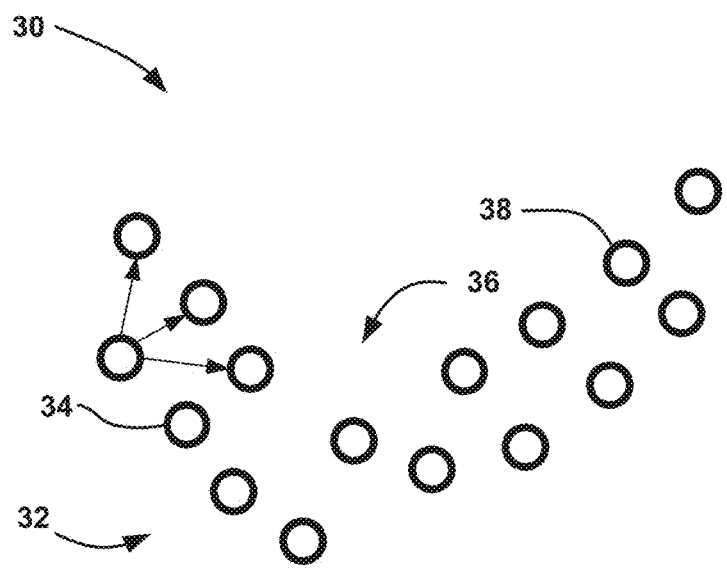
FIG. 4 is a representation of a radar scan cluster map at two consecutive sample times.

Various systems are known in the art that employ sensors providing multiple scan return points as discussion herein to detect multiple objects simultaneously. FIG. 4 is an illustration 30 showing a cluster map 32 of scan return points 34 at one point in time and a cluster map 36 of scan return points 38 at a subsequent point in time. The illustration 30 shows mapping of the scan points 34 from the earlier point in time to the later point in time. In one embodiment, the new cluster is provided in the next frame of data at a rate of about 100 milliseconds.

Figure 5:
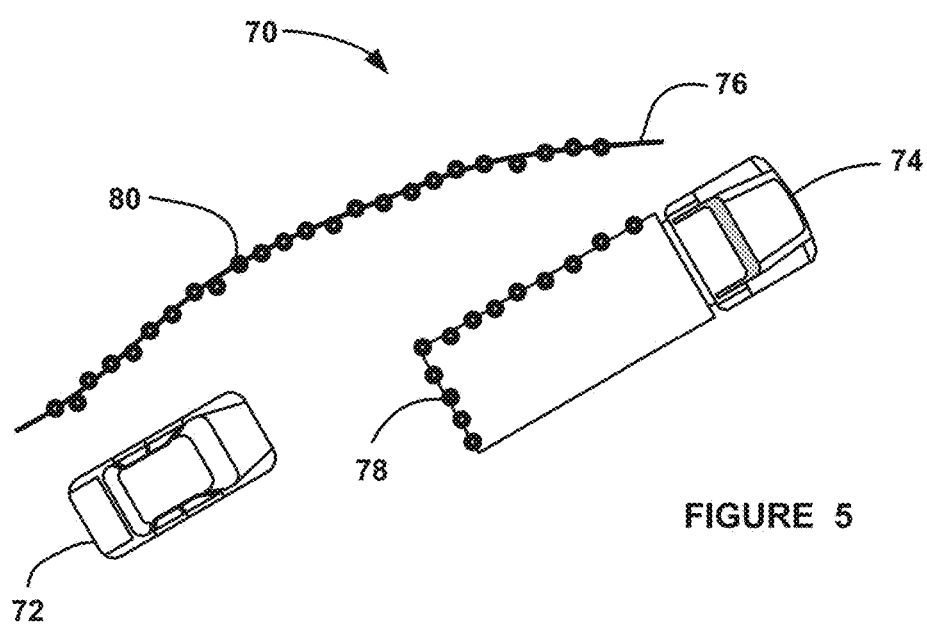
FIG. 5 is an illustration of radar scan points on various targets of different shapes.

FIG. 5 is an illustration 70 of a host vehicle 72 including a collision avoidance system (not shown) providing radar scan return points from various objects in proximity to the vehicle 72. For example, a truck 74 in front of the vehicle 72 provides a cluster of scan return points 78 and a barrier 76 along the side of the vehicle 72 provides a cluster of scan return points 80. Each detected object includes multiple scan point returns to choose from to determine if a collision is possible or probable as opposed to the traditional radar sensors that only provided a single return point. The illustration 70 shows that various targets may have various and different shapes. As is apparent, the cluster of the scan return points 78 may be able to identify the shape of the object.

Figure 6:
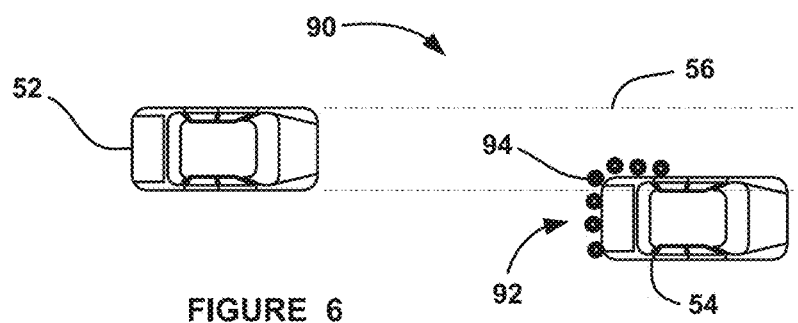
FIG. 6 is an illustration showing a host vehicle properly detecting a target vehicle in its travel path using multiple scan points.

FIG. 6 is an illustration 90 that is similar to the illustration 50, where like elements are identified by the same reference number. In this embodiment, the host vehicle 52 includes sensors (not shown) that provide a cluster 92 of scan point returns 94 so that the shape of the target vehicle 54 can be identified. The illustration 90 shows that the target vehicle 54 is in the collision path 56 and that the scan return points 94 provide an indication of a potential collision, referred to as a true positive.

Figure 7:
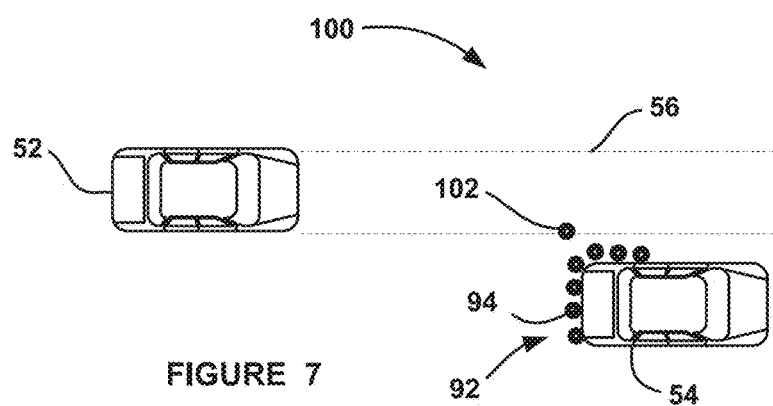
FIG. 7 is an illustration showing a host vehicle improperly detecting a target vehicle in its travel path when it is not.

FIG. 7 is an illustration 100 similar to the illustration 90, where like elements are identified by the same reference numeral. In the illustration 100, the target vehicle 56 is not in the collision path 56, however one of the scan point returns 102 is in the collision path 56, which would provide an alarm condition, referred to as a true negative.

As discussed above, traditional radar sensors have the disadvantage of providing missing alarms and false alarms as result of only a single radar return point being provided. Modern radar sensors that provide multiple scan point returns can reduce the number of missing alarms and false alarms because of the multiple scan point returns. Different techniques can be employed to take advantage of the multiple return points. The present invention proposes a technique where a potential or possible collision between a host vehicle and a target vehicle is identified by probability analysis employing statistics and histograms that determine whether the target vehicle is in or may enter the collision path with the host vehicle by comparing a percentage of the scan points returned from the target vehicle that are in the collision path to a threshold. In other words, statistical analysis can be employed that includes comparing the number of scan points that are received from the target to the number of those scan points that are within the collision path to determine if a collision is possible or likely. As will be discussed, multiple frames of data are statistically analyzed in this manner to determine the potential for collision.

It is noted that the discussion herein may specifically refer to target vehicles and radar sensors. However, as will be appreciated by those skilled in the art, the present invention has application for the detection of any object in the path of a host vehicle, where the host vehicle may include any type of sensor that provides multiple scan return points from the object.

Figure 8:
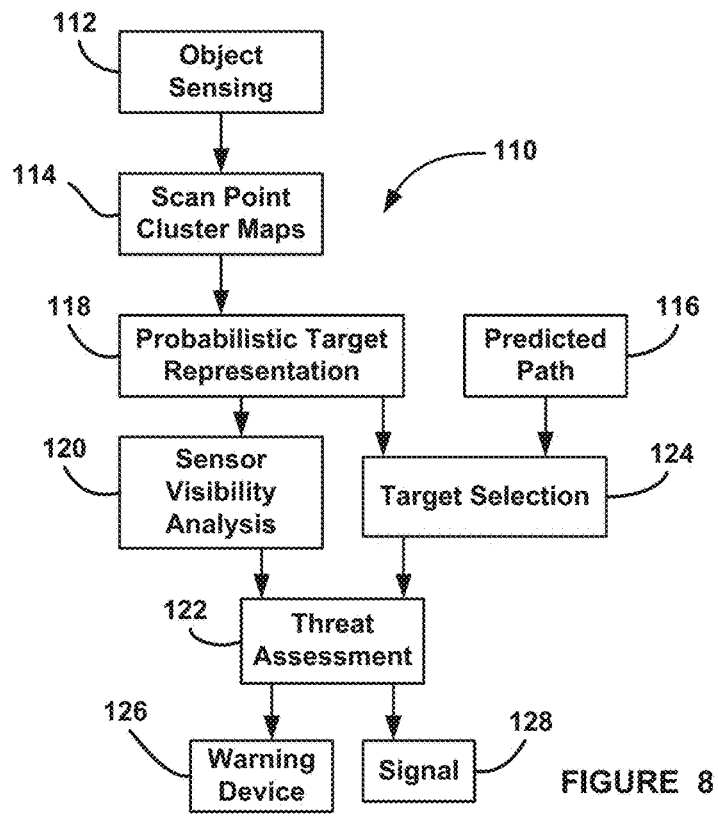
FIG. 8 is a block diagram of a threat assessment system on a vehicle.

FIG. 8 is a block diagram 110 showing a process for providing target threat assessment in a vehicle collision avoidance system. At box 112, the collision avoidance system provides object sensing using one or more sensors consistent with the discussion herein that provide the scan point cluster maps. The scan point cluster maps are provided to box 114 at the sample rate of the sensors where the algorithm performs data fusion if multiple sensors are employed and sensor classification if multiple types of sensors are employed. Many suitable data fusion and sensor classification algorithms are known to those skilled in the art for this purpose. The algorithm also determines a predicted path (collision path) of the host vehicle at box 116 using vehicle dynamics data, such as vehicle speed, vehicle yaw rate, steering angle, side-slip, etc., already available from existing sensors. Many suitable vehicle dynamic algorithms that can be used for this purpose are also known to those skilled in the art.

Figure 9:
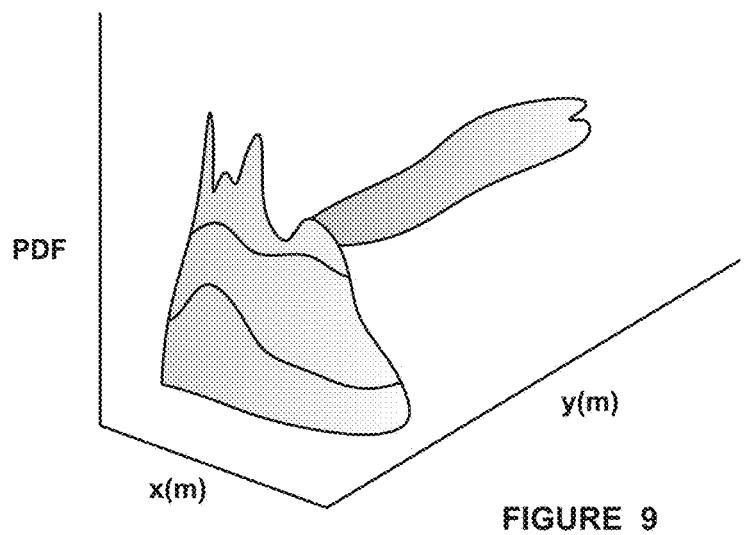
FIG. 9 is a graph illustrating a distribution of radar return points from a target in target coordinate frame.

The fused and classified scan point maps are provided to a probabilistic target representation box 118 that generates a distribution p(x) of the scan return points to represent a shape of each of the detected targets. In one non-limiting embodiment, the distribution p(x) is a probability distribution function (PDF), for example, a histogram, of the type shown in FIG. 9. FIG. 9 is a graph with position (x, y) on two of the axes and the PDF on the other axis where the number of scan return points at a specific location determines the magnitude of the PDF at that location. In this example, the PDF depicts the shape of the rear or front and side of a target vehicle.

The contour represented by the PDF is continually updated at each sample time by registering points in one scan cluster map to the next scan cluster map. For example, if the cluster 32 represents the scan points from one sample time and the cluster 36 represents the scan points for the next sample time, where the cluster 32 is an object model M, S is the current scan cluster 36, m are the scan points in the object model M and s are the scan points in the cluster S the distribution is updated by providing a rigid transformation of the scan points in the cluster 32 to the scan points in the cluster 36. Each detected target is tracked in this manner using the translation velocity v and the angular velocity ω of the target relative to a reference center r of the target vehicle.

Updating the PDF or distribution p(x) for each sample time can be performed as follows. By providing the object model M, the current radar map S (cluster), and a prior rigid motion $v^{(o)}$ from the object model M to the radar map S, the algorithm determines the rigid motion v by iteratively computing as:

$$v^{(n+1)} = \mathrm{argmin}_v \Sigma_{j,k} \hat{A}_{jk} \left( \frac{\|s_j - T_{v^{(n)}}(m_k)\|^2}{\sigma_1} \right), \quad (1)$$

where $s_j$ and $m_k$ are the scan points and the model points, respectively, and $T_{v^{(n)}}$ is the operator that applies the rigid motion v during Δt for point x at the nth epoch. The weight $\hat{A}_{jk}$ is the estimated probability of $s_j$ being a measurement of the model $m_k$.

The object model M is modeled as a Gaussian mixture model (GMM) as:

$$p(x; M) = \sum_{k=1}^{n_M} \frac{1}{n_M} p(x | m_k), \quad (2)$$

$$p(x | m_k) = \frac{1}{(2\pi\sigma^2)^{\frac{3}{2}}} \exp\left(-\frac{\|x - m_k\|^2}{2\sigma^2}\right). \quad (3)$$

Let the parameter $m_k$ be distributed as:

$$p(m_k) = \mathcal{N}\left(v_k, \frac{\sigma^2}{\eta_k}\right). \quad (4)$$

An update rule is provided as:

$$v'_k = \frac{\rho_k \bar{s}_k + \eta_k T_{y_{t+1}}(v_k)}{\rho_k + \eta_k}, \quad (5)$$

$$\rho_k = \Sigma_j \hat{A}_{jk}, \bar{s}_k = \Sigma_j \hat{A}_{jk} s_j / \rho_k, \quad (6)$$

$$\eta'_k = \eta_k + \rho_k. \quad (7)$$

The distribution or contour p(x) of the target vehicle, the position $(x_o, y_o)$ of the target vehicle, the translational movement (speed) of the target vehicle $(v_x, y_y)$, and the angular velocity ω of the target vehicle are output from the probabilistic target representation box 118 and provided to a sensor visibility analysis box 120, a threat assessment box 122 and a target selection box 124. The predicted path of the host vehicle from the box 116 is also provided to the target selection box 124. The target selection algorithm in the box 124 uses a probabilistic technique to select only those targets that have been detected as potentially being in a collision path with the host vehicle. The target selection algorithm reduces the complexity of the distribution p(x) by, for example, providing a reduced number of components $p(x|m_k)$ (denoted by points $m_k$) having a Gaussian distribution that combine to form the contour of the target vehicle in a manner well understood by those skilled in the art.

Figure 10:
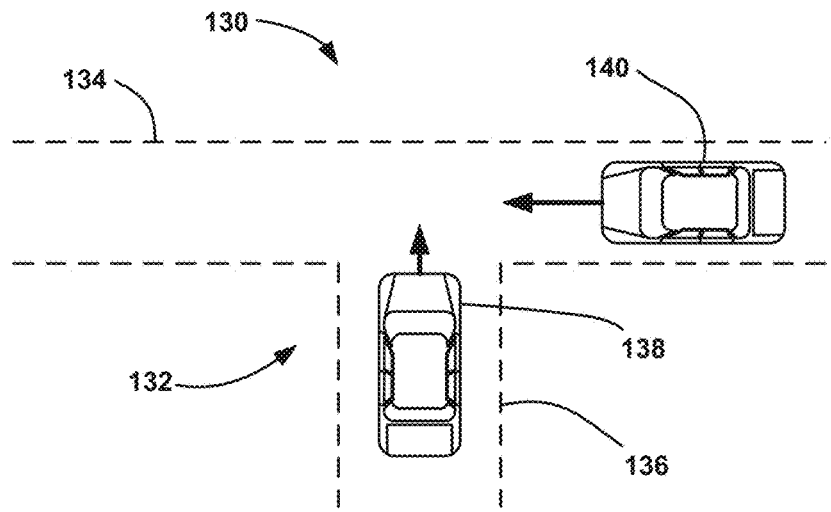
FIG. 10 is an illustration of two vehicles on a collision path at an intersection shown in a world-coordinate view.

In one example, if the host vehicle is at an intersection, a vehicle in a crossing-lane may be detected as being in the collision path with the host vehicle. FIG. 10 is an illustration 130 of an intersection 132 including vehicle travel lanes 134 and 136 that intersect. A host vehicle 138 is shown traveling in the lane 136 and a target vehicle 140 is shown traveling in the lane 134. The host vehicle 138 has speed $V_x$ and the target vehicle 140 has a speed $V_y$. In the illustration 130, the vehicles 138 and 140 are depicted in a world-coordinate view (x,y) where the origin of the coordinate system is at the center of gravity (CG) of the host vehicle 138.

Figure 11:
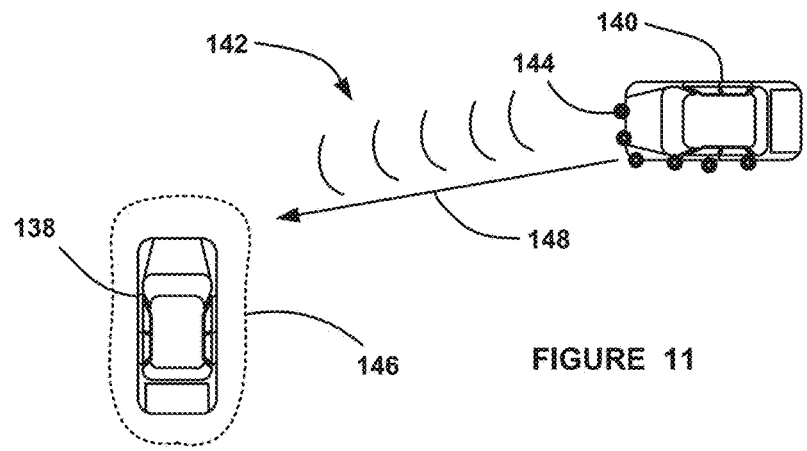
FIG. 11 is an illustration of two vehicles on a collision path shown in a vehicle-coordinate view.

FIG. 11 is an illustration 142 showing the host vehicle 138 and the target vehicle 140 in the same orientation as in the illustration 130, but in a vehicle-coordinate view. The host vehicle 138 is shown having a collision envelope 146 around it that is used as a buffer to make the vehicle 138 larger than it is for the collision calculations. The target vehicle 140 is shown with scan points 144, which is the reduced number of the actual scan return points referred to above, where the scan points 144 are sampled from the PDF as best identifying the position of the target vehicle 140 to reduce computational complexity. By providing a model for each target, a probability that the target vehicle 140 is on a potential collision path with the host vehicle 138 is determined. The target vehicle 140 is selected if the probability is larger than a predetermined threshold. For example, if any of the reduced number of points would enter the envelope 146, the algorithm determines that the target vehicle 140 is on a collision path with the host vehicle 138.

In another embodiment, the probabilistic target selection technique employs a Monte Carlo process. In this approach, the distribution p(x) is sampled for each model of each target vehicle that is detected into K particles $\{x_k, k=1, \ldots, K\}$. A particle is in a collision path with the host vehicle 138 if it crosses the envelope 146 of the host vehicle 138, where the envelope 146 can be increased or decreased to calibrate the sensitivity of the target selection algorithm. For each particle $x_k$, the particle's velocity $v_k$ is calculated as:

$$v_k = v + (x_k - r_o) \times \omega, \tag{8}$$

given the target center $r_o$, the target translation velocity $v$ and the angular velocity $\omega$.

Figure 12:
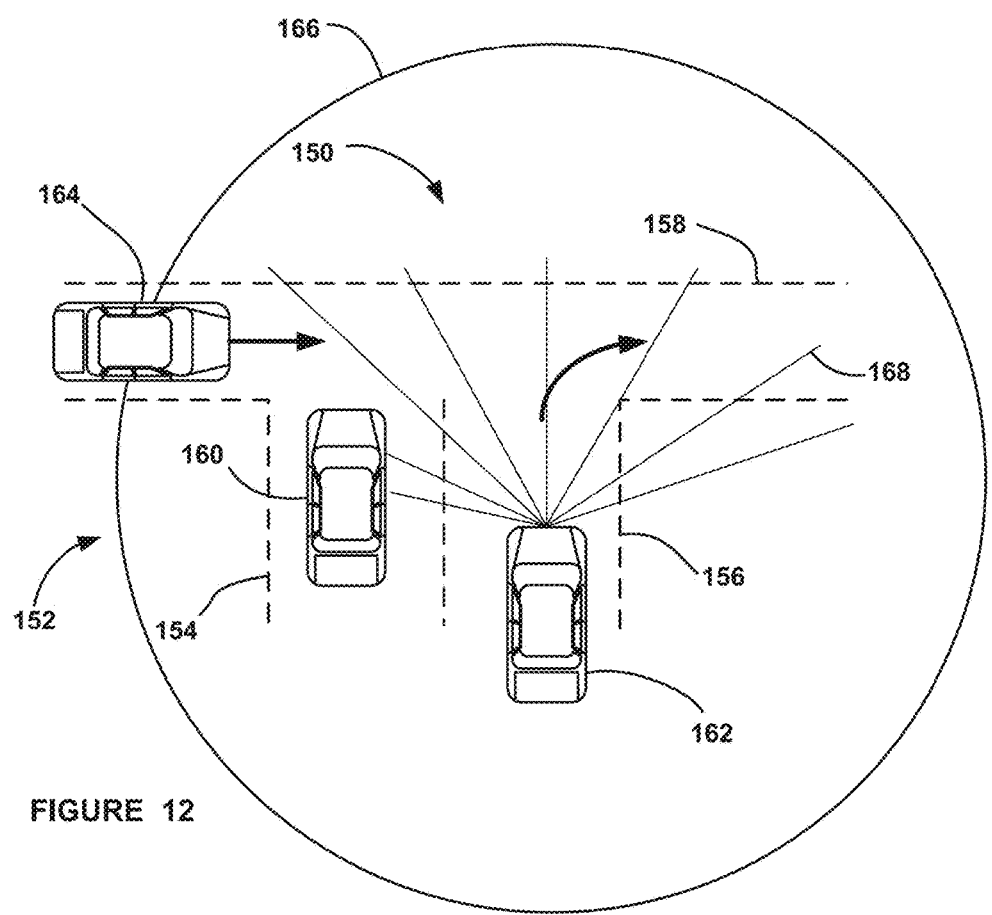
FIG. 12 is an illustration of a host vehicle approaching an intersection where a hidden vehicle may enter the intersection in front of the host vehicle.

The sensor visibility analysis algorithm in the box 120 provides target detection analysis if the sensors on the host vehicle are blocked in a particular direction. FIG. 12 is an illustration 150 showing an intersection 152 including side-by-side lanes 154 and 156 intersecting a crossing-lane 158. A host vehicle 162 is traveling in the lane 156 and is intending to make a right turn into the lane 158. A first target vehicle 160 is stopped in the lane 154 at the intersection 152 and a second target vehicle 164 is traveling along the lane 158 towards the host vehicle 162. Radar scans, represented by lines 168, from the host vehicle 162 having a range identified by circle 166 detect the target vehicle 160, but do not detect the target vehicle 164 because the radar signals are blocked by the target vehicle 160.

Figure 13:
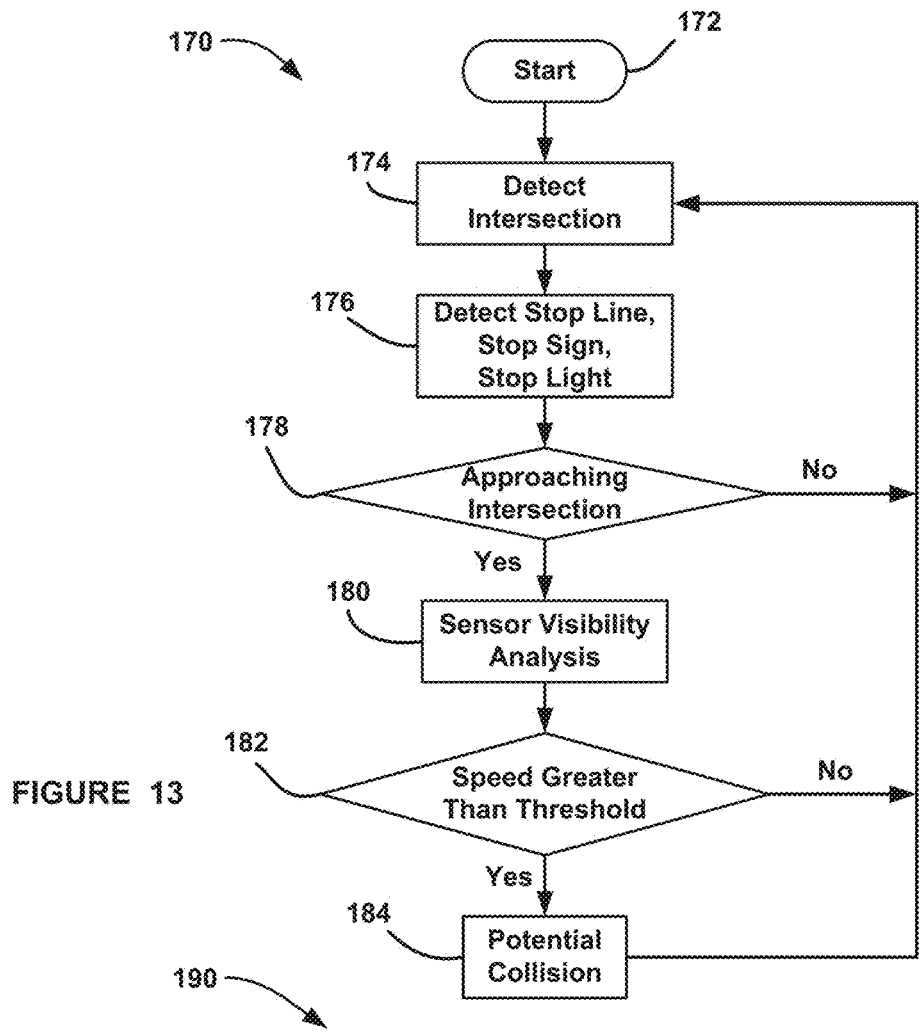
FIG. 13 is a flow chart diagram showing a process for providing sensor visibility analysis and threat assessment.

FIG. 13 is a flow chart diagram 170 showing a process for sensor visibility analysis at the box 120. The algorithm starts at oval 172, and proceeds to box 174 for detecting an intersection. The intersection detection process may include at box 176, for example, detecting a stop line, stop sign or stop light at the intersection using a sensor (e.g., a camera) or using a digital map data. If the intersection 152 is detected, the algorithm then determines whether the host vehicle 162 is approaching the intersection 152 at decision diamond 178, and if so, provides sensor visibility analysis at box 180. The sensor visibility analysis may include determining whether a target, such as the target vehicle 160, is being detected, and if so, whether it is within some minimal distance of the host vehicle 162, such as 30 meters, as represented by circle 166. Based on objects detected within the minimal distance and the location of those objects may cause the algorithm to set flags indicating that a potential threat may exist. The algorithm then determines whether the host vehicle speed is greater than a predetermined threshold at decision diamond 182. If the host vehicle speed is above the threshold and the algorithm indicates that the potential threat does exist, the algorithm provides a warning of a potential collision or braking if a collision is determined to be imminent at box 184, which is performed in the threat assessment box 122. The algorithm then returns to the box 174 to provide intersection detection. If the host vehicle 162 is not approaching the intersection at the decision diamond 178 or the host vehicle speed is below the threshold at the decision diamond 182, then the algorithm also returns to the box 174 to provide intersection detection.

The sensor visibility data and the target selection data are also provided to the threat assessment algorithm in the box 122 that determines the threat assessment. The threat assessment algorithm determines a time to collision (TTC) of each of the points on the target vehicle that are selected as being in the path of the host vehicle. In other words, the TTC for each point is analyzed to determine whether the target vehicle from which the points are received is a collision threat. In the robust time to collision computation, the algorithm does not select all of the targets that pose a threat to the host vehicle, but only those targets that have a positive TTC that are then analyzed. The TTC of the target vehicle is a distribution of the target points where each point has the position and velocity represented by $(x, y, v_x, v_y)$.

$$TTC = \min_i -\frac{x_i}{v_{xi}} = \min_i -\frac{y_i}{v_{yi}} \tag{9}$$

Figure 14:
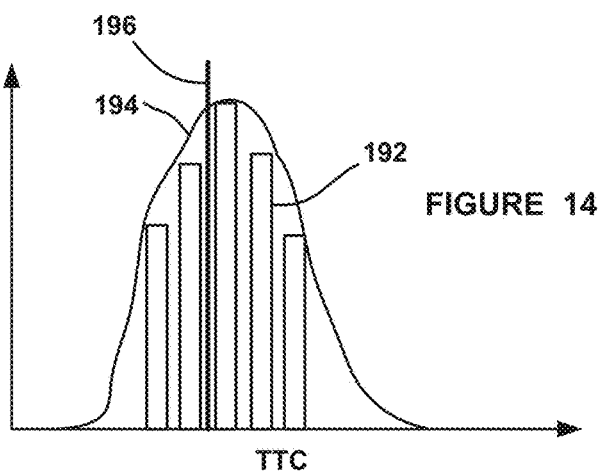
FIG. 14 is a graph with time on the horizontal axis and counts on the vertical axis showing a threat assessment alert zone.

The distribution of the TTC values can be estimated by using a histogram of the TTCs for all of the targets. FIG. 14 is a graph 190 with TTC on the horizontal axis and number of counts on the vertical axis showing the distribution referred to above. Each bar 192 in the graph 190 represents the number of points that have a TTC for that time for all of the targets. A histogram 194 shows the contour of the bars 192. Line 196 defines the TTC value below which an alert or hard braking will be given depending on the number of points that are less than the line 196. The number of points below the line 196 divided by the total number of points in the histogram 194 gives the probability of a collision.

If a minor threat assessment is determined, then the algorithm may provide a signal to a warning device represented by box 126 and if an imminent collision is determined, then the threat assessment algorithm provides a signal to box 128 representing hard braking. In one non-limiting embodiment, the warning is given if the probability of the collision is 30% for a threshold of three seconds and automatic braking is provided if the probability of the collision is greater than 30% for a threshold of 0.6 seconds.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing target threat assessment in a collision avoidance system on a host vehicle, said method comprising:
   determining a predicted travel path of the host vehicle using motion dynamics of the host vehicle;
   transmitting a scan signal from at least one sensor on the host vehicle;

receiving multiple scan return points at the host vehicle from one or more detected objects that reflect the scan signal;
generating a probability function distribution signal defining a contour of each detected object using the scan signal;
calculating a position and velocity of each detected object using the scan return points;
selecting the detected objects which have a probability exceeding a threshold of being in or entering the predicted travel path of the host vehicle using a probabilistic technique and the distribution signal, position and velocity of each detected object; and
determining a threat assessment of the selected objects by analyzing a time to collision (TTC) for each of the selected objects.

2. The method according to claim 1 wherein generating a distribution signal of each object includes updating the distribution signal at subsequent sample times using a Gaussian mixture model.

3. The method according to claim 1 wherein selecting the detected objects which have a probability exceeding a threshold of being in or entering the predicted travel path of the host vehicle includes reducing the complexity of the distribution signal by using a reduced number of the scan points.

4. The method according to claim 3 wherein selecting the detected objects which have a probability exceeding a threshold of being in or entering the predicted travel path of the host vehicle using the probabilistic technique includes representing each of the reduced number of scan points as a Gaussian distribution.

5. The method according to claim 1 wherein selecting the detected objects which have a probability exceeding a threshold of being in or entering the predicted travel path of the host vehicle using the probabilistic technique includes using a Monte Carlo technique that separates the distribution signal into a plurality of particles.

6. The method according to claim 1 wherein determining a threat assessment includes identifying a number of the scan points that are less than a predetermined threshold.

7. The method according to claim 1 further comprising performing sensor visibility analysis to determine if one or more of the sensors is being blocked in a particular direction, wherein determining a threat assessment includes determining a collision threat if one of the sensors is blocked.

8. The method according to claim 7 wherein performing sensor visibility analysis includes performing the sensor visibility analysis if it is determined that the host vehicle is at or approaching an intersection.

9. The method according to claim 1 wherein determining a threat assessment includes providing a warning of a potential collision and providing automatic braking for an imminent collision.

10. The method according to claim 1 wherein the at least one sensor is a radar sensor.

11. A method for providing target threat assessment in a collision avoidance system on a host vehicle, said method comprising:
determining a predicted travel path of the host vehicle using motion dynamics of the host vehicle;
transmitting a radar signal from at least one radar sensor on the host vehicle;
receiving multiple scan return points at the host vehicle from one or more detected objects that reflect the radar signal;
generating a probability function distribution signal defining a contour of each detected object using the radar signal, wherein generating a distribution signal of each detected object includes updating the distribution signal at subsequent sample times using a Gaussian mixture model;
calculating a position, a translation velocity and an angular velocity of each detected object using the scan return points;
selecting the detected objects which have a probability exceeding a threshold of being in or entering the predicted travel path of the host vehicle using the distribution signal, position, translation velocity and angular velocity of each object, wherein selecting the detected objects which have a probability exceeding a threshold of being in or entering the predicted travel path of the host vehicle includes using a probabilistic technique; and
determining a threat assessment of the selected objects by analyzing a time to collision (TTC) for each of the selected objects.

12. The method according to claim 11 wherein selecting the detected objects which have a probability exceeding a threshold of being in or entering the predicted travel path of the host vehicle includes reducing the complexity of the distribution signal to a reduced number of the scan points.

13. The method according to claim 12 wherein selecting the detected objects which have a probability exceeding a threshold of being in or entering the predicted travel path of the host vehicle using the probabilistic technique includes representing each of the reduced number of scan points as a Gaussian distribution.

14. The method according to claim 11 wherein selecting the detected objects which have a probability exceeding a threshold of being in or entering the predicted travel path of the host vehicle using the probabilistic technique includes using a Monte Carlo technique that separates the distribution signal into a plurality of particles.

15. The method according to claim 11 further comprising performing sensor visibility analysis to determine if one or more of the sensors is being blocked in a particular direction, wherein determining a threat assessment includes determining a collision threat if one of the sensors is blocked.

16. The method according to claim 15 wherein performing sensor visibility analysis includes performing the sensor visibility analysis if it is determined that the host vehicle is at or approaching an intersection.

17. An analysis system for providing target threat assessment in a collision avoidance system on a host vehicle, said analysis system comprising:
vehicle dynamics sensors on the host vehicle providing vehicle motion dynamics data;
at least one sensor on the host vehicle transmitting a scan signal and receiving multiple scan return points from one or more detected objects that reflect the scan signal; and
a processor configured with an algorithm including steps of:
determining a predicted travel path of the host vehicle using the vehicle motion dynamics data;
generating a probability function distribution signal defining a contour of each detected object using the scan signal;
calculating a position and velocity of each detected object using the scan return points;
selecting the detected objects which have a probability exceeding a threshold of being in or entering the predicted travel path of the host vehicle using a probabilistic technique and the distribution signal, position and velocity of each detected object; and determining a threat assessment of the selected objects by analyzing a time to collision (TTC) for each of the selected objects.

18. The analysis system according to claim 17 wherein selecting the detected objects which have a probability exceeding a threshold of being in or entering the predicted travel path of the host vehicle reduces the complexity of the distribution signal by using a reduced number of the scan points.

19. The analysis system according to claim 18 wherein selecting the detected objects which have a probability exceeding a threshold of being in or entering the predicted travel path of the host vehicle using the probabilistic technique represents each of the reduced number of scan points as a Gaussian distribution.

20. The analysis system according to claim 17 wherein selecting the detected objects that may which have a probability exceeding a threshold of being in or entering the predicted travel path of the host vehicle using the probabilistic technique uses a Monte Carlo technique that separates the distribution signal into a plurality of particles.

* * * * *